Jan. 2, 1968   S. SENDEROFF ET AL   3,361,596
CATHODE-DEPOLARIZERS FOR HIGH TEMPERATURE
ELECTROCHEMICAL DEVICES
Original Filed March 14, 1966
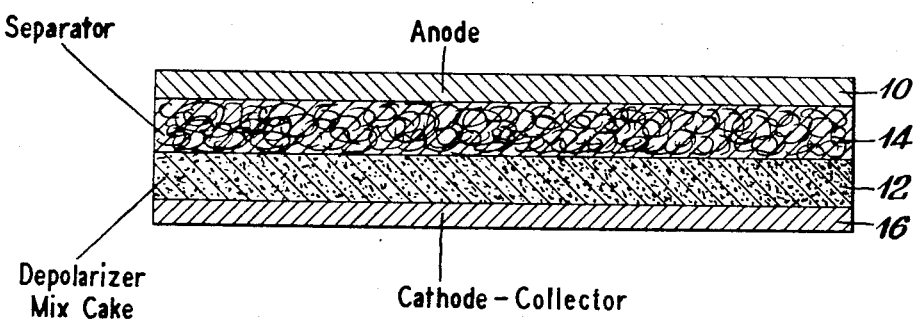
INVENTORS.
SEYMOUR SENDEROFF
EDWARD M. KLOPP

United States Patent Office 3,361,596
Patented Jan. 2, 1968

3,361,596
CATHODE-DEPOLARIZERS FOR HIGH TEMPERATURE ELECTROCHEMICAL DEVICES
Seymour Senderoff, Fairview Park, and Edward M. Klopp, Seville, Ohio, assignors to Union Carbide Corporation, a corporation of New York
Continuation of application Ser. No. 534,181, Mar. 14, 1966. This application Dec. 22, 1966, Ser. No. 605,137
13 Claims. (Cl. 136—137)

ABSTRACT OF THE DISCLOSURE

Significantly higher energy densities are obtained in a high temperature electrochemical device and in particular a thermal cell by employing a cathode-depolarizer material comprising a compound containing a cation component of a metal and an anion component of a nonvolatile, stable, oxygenated anion of an element in Periods 2 and 3 of the Periodic System. Representative compounds include, the aluminates, borates, carbonates, phosphates, silicates, silicoaluminates and sulphates.

---

This application is a continuation of the application of Seymour Senderoff and Edward M. Klopp, Ser. No. 534,181, filed on Mar. 14, 1966, and now abandoned, for Improved Cathode-Depolarizers for High Temperature Electrochemical Devices. Application Ser. No. 534,181 is a continuation-in-part of the earlier application of Seymour Senderoff and Edward M. Klopp, Ser. No. 203,850, filed on June 20, 1962 and now abandoned.

The invention relates to high temperature electrochemical devices and refers more particularly to certain improved cathode-depolarizers therefor.

More specifically, the invention relates to high temperature electrochemical devices of the thermal cell type having an anode and an electrolyte of a fused salt, and to the provision therein of certain improved cathode-depolarizers which are thermally stable at elevated temperatures.

Although the invention is primarily useful in high temperature thermal cells and will be described particularly in this connection, it is to be understood that the invention is applicable to other types of high temperature electrochemical devices employed for both chemical synthesis and electrical power.

Thermal cells have been known for sometime now. They are based on an electrolyte of a fused salt which is solid and stable at low temperatures. When heated to elevated temperatures beyond the melting point of the electrolyte, these thermal cells become activated and electrical energy can be withdrawn from them. An outstanding advantage of thermal cells is their ability to be stored at relatively low temperatures for an indefinite period of time without any loss of their potential energy.

Hitherto, basically two materials have been employed as the cathode-depolarizer in thermal cells. These are $CrO_3$ and $V_2O_5$. Both of these materials have, however, suffered from certain disadvantages. For instance, $CrO_3$ begins to decompose at a relatively low temperature below about 200° C. This has proven to be a rather serious drawback since most thermal cells employ as the electroylte a eutectic of KCl-LiCl which melts at temperature of about 350° C. Hence $CrO_3$ is appreciably decomposed when the thermal cells are activated. $V_2O_5$, on the other hand, is somewhat more thermally stable but has nonetheless suffered in that its coulombic capacity is extremely low, resulting in thermal cells having low energy densities. Furthermore, $V_2O_5$ is prone to reaction with the KCl-LiCl electrolyte. This reaction produces chlorine and reduced vanadium compounds which are non-reactive and, in consequence, only a small fraction of the potential energy can be withdrawn from the thermal cells, the major portion being dissipated as heat.

Broadly stated, the principal object of the invention is to provide certain improved cathode-depolarizers for high temperature electrochemical devices.

A more specific object is to provide certain improved cathode-depolarizers for high temperature thermal cells having high coulombic capacities and which are not prone to reaction with the electrolyte, and which are thermally stable at elevated temperatures.

Another object is to provide high temperature thermal cells which are capable of delivering high outputs of energy per unit weight of active material.

Still another object is to provide high temperature thermal cells which are capable of delivering high energy outputs for longer periods of discharge.

These and other objects are achieved by the invention which will be described with reference to the accompanying drawing, wherein the single figure is a vertical section of a typical thermal cell embodying the invention.

According to the invention, there are provided within high temperature electrochemical devices particularly of the thermal cell type, certain improved cathode-depolarizers comprising a material selected from the group consisting of a compound containing a cation component of a metal and an anion component selected from the group consisting of the nonvolatile, stable, oxygenated anions of an element in Periods 2 and 3 of Groups III–A to VI–A of the Periodic System, and the oxides of boron and silicon.

The term "nonvolatile" as used herein and in the appended claims is intended to refer to the thermal stability of a material at elevated temperatures and particularly those in excess of about 600° C. Specifically, the term is meant to exclude the use of nitrogenous compounds as the cathode-depolarizer in the practice of the invention.

More particularly and in accordance with the invention, it has been discovered that while the oxygenated anions of the Group III–A to VI–A elements in the second and third periods and the oxides of boron and silicon are generally known to undergo little or no electrolytic reduction at temperatures below about 450° C., these materials are reduced at significant rates in a fused salt electrolyte when heated to elevated temperatures upwards of 600° C. and beyond. In addition, these materials have been found to possess high coulombic capacities, and they are characterized by both low ionic weights and low electrochemical equivalents. Furthermore, they are not prone to reaction with the electrolyte and are thermally stable at the elevated temperatures contemplated.

Suitable oxygenated anions for the cathode-depolarizers include the aluminates, borates, carbonates, silicates, silicoaluminates and the like. The generally preferred cathode-depolarizers are those having an anion component of the phosphates or sulphates. These are preferred because of their availability and high coulombic capacities at temperatures of 600° C. and above. Of the oxides mentioned, the silica should be of an active type, such as might be produced by mildly dehydrating silicic acid. In the case of nitrogen, the oxygenated anions are unsuitable because they are volatile and decompose at relatively low temperatures.

Cathode-depolarizers in accordance with the invention may employ a cation of a metal or other suitable positively charged element. Some elements having the characteristics of metal but which are not generally classified as metals, notably boron for example, are suitable and may also be used. The requirements of the cation are not at all critical, it being essential only that the metal will form, together with the oxygenated anion, a compound which is electrolytically reducible and thermally stable under the operating conditions of the thermal cell. Examples of suitable metals are aluminum, calcium, copper and iron. The preferred cations are those of the lighter metals, for example, sodium and magnesium. These are generally preferred over the heavier metals since the best energy density performance is obtained. Other suitable metals for use as the cation of the cathode-depolarizer will readily occur to those skilled in the art.

As specific examples of the materials useful as the cathode-depolarizers in the practice of the invention, the following are illustrative:

$Ca_3(PO_4)$  $NaPO_3$
$MgCO_3$     $Fe_2(SO_4)_3$
$MgSO_4$     $CuSO_4$
$Na_2CO_3$   $KPO_3-LiPO_3$
$NaBO_2$

In some instances, clays may be used as the cathode-depolarizers, these clays being generally represented by the formula:

$$xK_2O \cdot yAl_2O_3 \cdot zSiO_2$$

It should be understood that the materials listed above are merely illustrative, and that many other materials may be used as the depolarizers as will be apparent to those skilled in the art.

Referring now to the drawing, there is shown a typical thermal cell embodying the invention. As shown, the thermal cell comprises an anode 10 suitably composed of calcium or magnesium metal, and a cathode-depolarizer mix cake 12 containing electrolyte, for example, a eutectic of KCl-LiCl. Between the anode 10 and the cathode-depolarizer mix cake 12 is a separator 14 of the bibulous material which is impregnated with the electrolyte, the separator 14 being suitably composed of a porous layer of powdered fused magnesia, zirconia or alumina. A cathode-collector 16 of nickel, for example, is disposed adjacent to the depolarizer mix cake 12.

Although not shown, the thermal cell may be provided with a container of most any design. The container should be hermetically sealed and should be composed of materials which are stable at high temperatures. A suitable container is described and claimed in U.S. Patent No. 3,201,278 issued to T. J. Kurtzweil et al. on August 17, 1965.

In the practice of the invention, the cathode-depolarizer is employed in a finely-divided state and is incorporated into the mix cake 12, suitably by molding, preferably with a conductive material in an amount sufficient to keep the resistance of the cell as low as possible. The conductive material may be powdered carbon or graphite, for example, or it may be a finely-divided metal, copper being suitable. Where the cathode-depolarizer is sufficiently low in resistance, the conductive material is not necessary. It should be mentioned that the electrolyte is preferably added before the mix cake 12 is made so that an intimate mixture of electrolyte and depolarizer is achieved. This can be important should it be desired to keep the concentration polarization of the cell at a minimum level.

The electrolyte should be a fused salt which does not react with the cell ingredients and which possesses a high ionic conductivity. Besides the KCl-LiCl electrolyte, a fused salt of KCl-NaCl can be used, this electrolyte being particularly suitable at temperatures above 650° C. It is not necessary for the mix cake 12 to contain the electrolyte when the depolarizer is ionically conductive such as in the case of $LiPO_3-KPO_3$ and $Li_2SO_4-K_2SO_4$.

Where convenient, the proportions of active ingredients should be kept as close as possible to the stoichiometric requirements for a balanced cell reaction. When a conductive material is used in the mix cake 12, the amount will, of course, depend on the conductivity of both the depolarizer and electrolyte.

The following table lists a number of thermal cell systems possible in accordance with the invention, together with the postulated cell reactions for each system.

TABLE I

| System | Postulated Cell Reaction |
|---|---|
| Mg/KCl-LiCl/MgSO$_4$ | 3Mg+MgSO$_4$→4MgO+S |
| Mg/KCl-LiCl/CuSO$_4$ | 4Mg+CuSO$_4$→4MgO+Cu+S |
| Mg/KCl-LiCl/Ca$_3$(PO$_4$)$_2$ | 5Mg+Ca$_3$(PO$_4$)$_2$→5MgO+3CaO+2P |
| Ca/KCl-LiCl/Na$_2$CO$_3$ | 2Ca+Na$_2$CO$_3$→Na$_2$O+2CaO+C |
| Mg/KCl-LiCl/MgCO$_3$ | 2Mg+MgCO$_3$→3MgO+C |
| Mg/KCl-LiCl/Al$_2$SiO$_5$ | 2Mg+Al$_2$SiO$_5$→2MgO+Al$_2$O$_3$+Si |
| Ca/KCl-LiCl/B$_2$O$_3$ | 3Ca+B$_2$O$_3$→3CaO+2B |
| Mg/KCl-LiCl/B$_2$O$_3$ | 3Mg+B$_2$O$_3$→3MgO+2B |
| Mg/KCl-LiCl/SiO$_2$-C | 2Mg+SiO$_2$+C→SiC+2MgO |

While the reaction products indicated in Table I have been identified in several cases in the discharged cell, it is to be understood that the cell reactions may not go as simply as written and that the invention is not restricted to the reactions indicated. For instance, it has already been shown that very complex reactions are involved in some cases and that the reduction proceeds in at least one instance by mixed electrolytic and thermal disproportionation mechanisms.

When the phosphates are used as the cathode-depolarizer, the normally polymerized state of the molten phosphate increases the viscosity and decreases the conductivity of the depolarizer mix cake. This effect can be largely eliminated by incorporating a small amount of a fluoride with the electrolyte, NaF being preferred. The optimum range of the fluoride is believed to be about 0.9 percent by weight of the fluoride ion based on the weight of the phosphate compound employed. For example, NaF is effectively used in the range of 1.9 to 2.0 percent by weight of the NaF-phosphate mixture.

The outstanding advantage of the cathode-depolarizers of the invention resides in their thermal stability at elevated temperatures. In addition, the depolarizers are not prone to reaction with the electrolyte.

A further advantage of thermal cells of the invention is that of high energy densities, that is, energy output per weight of active material. Furthermore, the thermal cells are capable of delivering this high energy output for longer periods of discharge. In comparison to prior thermal cells in which discharge periods of up to only several minutes could be obtained, the thermal cells of the invention can be discharged for periods of up to 30 minutes or more at current densities of about 100 to 500 ma./cm.$^2$.

A great many thermal cells embodying the invention have been made and tested under a variety of conditions. The following table lists a number of these thermal cells, together with the conditions of test and the energy densities obtained.

TABLE II

| Ex. No. | Cathode-Depolarizer, Percent by Weight | Conductive Material, Percent by Weight | Electrolyte in Cathode-Depolarizer Mix Cake, Percent by Weight | Anode | Open Circuit Voltage | Operating Temperature, °C. | Energy Density, W. hrs./lb. Active Material |
|---|---|---|---|---|---|---|---|
| 1 | 33.3% $Fe_2(SO_4)_3$ | 23.3% Graphite | 43.4% KCl-LiCl | Mg | 1.83 | 600 | 414 |
| 2 [1] | 27.1% $CuSO_4$ | 13.5% Cu Powder, 21.5% Graphite | 37.9% KCl-LiCl | Ca | 2.41 | 560 | 387 |
| 3 | 28% $NaPO_3$ | 15% Graphite | 57% KCl-LiCl | Ca | 2.43 | 600 | 226 |
| 4 | 28% $NaPO_3$ | 15% Graphite | 57% KCl-LiCl | Ca | 2.22 | 700 | 225.5 |
| 5 | 25.7% $SiO_2$ | 5.1% Graphite, 7.7% Cu Powder | 61.5% KCl-LiCl | Ca | 2.22 | 570 | 88 |
| 6 | 20% $MgSO_4$ | 40% Graphite | 40% KCl-LiCl | Ca | 2.05 | 600 | 116 |
| 7 [1] | 64.9% $CaSO_4$ | 6.5% Graphite, 2.6% Cu Powder | 26% KCl-LiCl | Ca | 2.64 | 600 | 190 |
| 8 [2] | 64.2% $CaSO_4$ | 7.4% Graphite, 2.5% Cu Powder | 25.9% NaCl-KCl | Ca | 2.65 | 825 | 89.5 |
| 9 | 38.8% $Al_2(SO_4)_3$ | 16.2% Graphite | 45% KCl-LiCl | Ca | 2.38 | 700 | 203 |
| 10 | 33.3% $CuSO_4$ | 23.4% Graphite | 43.3% KCl-LiCl | Mg | 2.2 | 600 | 272 |
| 11 | 40% $Fe_2(SO_4)_3$ | 14% Graphite, 12% Cu Powder | 34% KCl-LiCl | Ca | 2.52 | 560 | 330 |
| 12 | 18% Chrysotile (3MgO.2$SiO_2$.2$H_2O$) | 9% Cu Powder | 73% KCl-LiCl | Ca | 2.25 | 530 | 114 |
| 13 [2] | 67% $K_2SO_4$-$Li_2SO_4$ Eutectic | 16.5% Graphite, 16.5% Cu Powder | 0% | Ca | 2.50 | 600 | 90.5 |
| 14 [2] | 75.7% $KPO_3$-$LiPO_3$ Eutectic+1.5% NaF | 22.8% Graphite | 0% | Ca | 2.95 | 700 | 256 |
| 15 [2] | 75.7% $KPO_3$-$LiPO_3$ Eutectic+1.5% NaF | 22.8% Graphite | 0% | Mg | 3.22 | 600 | 322 |
| 16 [2] | 34.2% $CuPO_3$, 51% $LiPO_3$ | 14.8% Graphite | 0% | Ca | 3.22 | 600 | 293 |

[1] All cells were tested on a 2 ohm load except in Example Nos. 2 and 7. In Example No. 2, both a 2 ohm and a 1 ohm load were employed consecutively, while in Example No. 7 a 1 ohm load was used.

[2] The separator in these cells was impregnated with a eutectic of KCl-LiCl.

NOTE.—All percents given in the table are percents by weight of the total cathode-depolarizer mix cake.

The values of energy density given in the table were calculated on the basis of a balanced composition, that is, for the combined weight of the anode and calculated amount of cathode-depolarizer required for a balanced cell. The cathode-depolarizer employed in the examples was in excess of that required by a small amount so that the actual values of energy density would be slightly lower than indicated.

The thermal cells listed in the table were discharged for periods of up to 30 minutes and beyond. In the particular case of Example No. 15, the cell was discharged for 61 minutes at 100 ma./cm.$^2$.

For classification of the cathode-depolarizer described herein, reference is made to the standard Periodic Table appearing on page 4 of "Treatise on Inorganic Chemistry" by H. Remy, vol. 1, 1956.

We claim:

1. A high temperature electrochemical device comprising an anode, a cathode-depolarizer and an electrolyte in contact with said cathode-depolarizer, said cathode-depolarizer comprising a compound containing a cation component of a metal and an anion component selected from the group consisting of the nonvolatile, stable, oxygenated anions of an element in Periods 2 and 3 of Groups III–A to VI–A of the Periodic System.

2. A thermal cell comprising an anode, a cathode-depolarizer and a fused salt electrolyte in contact with said cathode-depolarizer, said cathode-depolarizer comprising a compound containing a cation component of a metal and an anion component selected from the group consisting of the oxygenated anions of aluminum, boron, carbon, phosphorus, silicon and sulfur.

3. A thermal cell comprising an anode, a cathode-depolarizer mix cake, a bibulous separator disposed between said anode and said cathode-depolarizer mix cake and containing a fused salt electrolyte, and a cathode-collector in contact with said cathode-depolarizer mix cake, said cathode-depolarizer mix cake comprising a compound containing a cation component of a metal and an anion component selected from the group consisting of the aluminates, borates, carbonates, phosphates, silicates, silicoaluminates and sulphates.

4. A thermal cell as defined by claim 3 wherein said anode is composed of a metal selected from the group consisting of calcium and magnesium.

5. A thermal cell as defined by claim 3 wherein said cathode-collector is composed of nickel.

6. A thermal cell as defined by claim 3 wherein said fused salt electrolyte is composed of a eutectic of KCl-LiCl.

7. A thermal cell as defined by cliam 3 wherein said cathode-depolarizer mix cake contains a conductive material selected from the group consisting of carbon, graphite and copper.

8. A thermal cell as defined by claim 3 wherein said cathode-depolarizer mix cake contains a compound composed of a sulphate.

9. A thermal cell as defined by claim 3 wherein said cathode-depolarizer mix cake contains a compound composed of a phosphate and wherein a fluoride is added to said electrolyte in an amount up to about 0.9 percent by weight of said phosphate.

10. A thermal cell as defined by claim 3 wherein said cathode-depolarizer mix cake contains a compound composed of a eutectic of $LiPO_3$-$KPO_3$.

11. A thermal cell as defined by claim 3 wherein said cathode-depolarizer mix cake contains a compound composed of a eutectic of $Li_2SO_4$-$K_2SO_4$.

12. A thermal cell as defined by claim 3 wherein said cathode-depolarizer mix cake contains an electrolyte composed of a eutectic of KCl-NaCl.

13. A thermal cell as defined by claim 3 wherein said separator is composed of a material selected from the group consisting of magnesia, zirconia and alumina.

References Cited

UNITED STATES PATENTS

| | | | |
|---|---|---|---|
| 1,963,550 | 6/1934 | Greger | 136—86.1 |
| 2,102,701 | 12/1937 | Gyuris | 136—83.1 |
| 2,562,215 | 7/1951 | Ruben | 136—143 X |
| 2,631,180 | 3/1953 | Robinson. | |
| 2,670,395 | 2/1954 | Audubert et al. | 136—137 X |
| 2,999,122 | 9/1961 | Zauner | 136—153 X |
| 3,055,960 | 9/1962 | Yalom et al. | 136—83 X |

WINSTON A. DOUGLAS, *Primary Examiner.*

D. L. WALTON, *Assistant Examiner.*